(12) United States Patent
Takaya et al.

(10) Patent No.: US 7,246,488 B2
(45) Date of Patent: Jul. 24, 2007

(54) EXHAUST GAS PURIFYING SYSTEM (75) Inventors: Masahiro Takaya, Yokosuka (JP);
Shinji Yamamoto, Yokosuka (JP);
Hiroaki Kaneko, Yokohama (JP);
Hitoshi Onodera, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/183,980

(22) Filed: Jul. 19, 2005

(65) Prior Publication Data

US 2005/0247047 A1 Nov. 10, 2005

Related U.S. Application Data (62) Division of application No. 10/833,049, filed on Apr. 28, 2004, now Pat. No. 6,932,067.

(30) Foreign Application Priority Data

May 27, 2003 (JP) .............................. 2003-148518

(51) Int. Cl.
*F01N 3/10* (2006.01)
*B01D 50/00* (2006.01)

(52) U.S. Cl. .................. 60/299; 422/168; 422/169; 422/170

(58) Field of Classification Search ................. 60/299; 422/168, 169, 170
See application file for complete search history.

(56) References Cited

U.S. PATENT DOCUMENTS

| | | | |
|---|---|---|---|
| 5,298,981 A | 3/1994 | Topper et al. | |
| 5,768,888 A | 6/1998 | Matros et al. | |
| 5,804,148 A | 9/1998 | Kanesaka et al. | |
| 5,975,046 A * | 11/1999 | Kaneko et al. | ............. 123/300 |
| 6,047,544 A * | 4/2000 | Yamamoto et al. | ............ 60/285 |
| 6,171,556 B1 * | 1/2001 | Burk et al. | ................. 422/173 |
| 6,708,484 B2 * | 3/2004 | Onodera et al. | ............... 60/286 |
| 2003/0027719 A1 | 2/2003 | Kawabata et al. | |
| 2003/0099583 A1 | 5/2003 | Ikeda et al. | |
| 2004/0001782 A1 * | 1/2004 | Kumar et al. | ................ 422/180 |
| 2004/0237515 A1 * | 12/2004 | Takaya et al. | ................. 60/301 |

FOREIGN PATENT DOCUMENTS

| | | |
|---|---|---|
| EP | 0 895 803 A2 | 2/1999 |
| EP | 1 068 892 A2 | 1/2001 |
| EP | 1 256 704 A2 | 11/2002 |
| EP | 1 308 200 A1 | 5/2003 |
| JP | 7-124467 A | 5/1995 |
| JP | 7-174017 A | 7/1995 |
| JP | 7-213910 A | 8/1995 |

(Continued)

*Primary Examiner*—Thomas Denion
*Assistant Examiner*—Loren Edwards
(74) *Attorney, Agent, or Firm*—Foley & Lardner LLP (57) ABSTRACT

An exhaust gas purifying system of the present invention comprises a first catalyst which contains a noble metal and reduces hydrocarbons contained in exhaust gas, and a second catalyst which is disposed downstream of the first catalyst and contains β-zeolite. In the exhaust gas purifying system, a mixed gas having an air-fuel ratio of not less than 25 is burned in an internal combustion engine, and the internal combustion engine discharges the exhaust gas having an oxygen concentration of not less than 4% continuously or intermittently.

22 Claims, 6 Drawing Sheets

FOREIGN PATENT DOCUMENTS

| | | |
|---|---|---|
| JP | 8-508442 A | 9/1996 |
| JP | 9-228828 A | 9/1997 |
| JP | 9-256840 A | 9/1997 |
| JP | 2002-263450 A | 9/2002 |
| JP | 2002-295247 A | 10/2002 |
| JP | 2003-71250 A | 3/2003 |

* cited by examiner

| No. | First catalyst | Second catalyst | A/F(±0.5) | Oxygen concentration(%) | HC amount(g/test) | HC conversion rate(%) |
|---|---|---|---|---|---|---|
| 1 | | Catalyst A(β-Zeolite : 250g/L) | 11.5 | 2.587 | 0.3 | 2 |
| 2 | | Catalyst B(β-Zeolite : 265g/L) | 12 | 2.7 | 0.2 | 4 |
| 3 | | Catalyst C(USY·ZSM5 : 245g/L) | 10.5 | 2.3625 | 0.32 | 1 |
| 4 | | Catalyst D(USY·ZSM5 : 245g/L) | 9.8 | 2.205 | 0.19 | 3 |
| 5 | | Catalyst A(β-Zeolite : 249g/L) | 10.2 | 2.295 | 0.18 | 4 |
| 6 | | Catalyst B(β-Zeolite : 255g/L) | 10.4 | 2.34 | 0.15 | 5 |
| 7 | | Catalyst C(USY·ZSM5 : 244g/L) | 9.9 | 2.2275 | 0.145 | 2 |
| 8 | | Catalyst D(USY·ZSM5 : 240g/L) | 10 | 2.25 | 0.128 | 3 |
| 9 | | Catalyst A(β-Zeolite : 252g/L) | 20 | 4.5 | 0.149 | 40 |
| 10 | | Catalyst B(β-Zeolite : 249g/L) | 21 | 4.725 | 0.162 | 45 |
| 11 | Three-way catalyst | Catalyst C(USY·ZSM5 : 248g/L) | 22.5 | 5.0625 | 0.148 | 15 |
| 12 | | Catalyst D(USY·ZSM5 : 247g/L) | 21.3 | 4.7925 | 0.175 | 25 |
| 13 | | Catalyst A(β-Zeolite : 250g/L) | 20.3 | 4.5675 | 0.125 | 50 |
| 14 | | Catalyst B(β-Zeolite : 239g/L) | 22 | 4.95 | 0.135 | 65 |
| 15 | | Catalyst C(USY·ZSM5 : 260g/L) | 19.8 | 4.455 | 0.128 | 20 |
| 16 | | Catalyst D(USY·ZSM5 : 262g/L) | 23 | 5.175 | 0.119 | 30 |
| 17 | | Catalyst A(β-Zeolite : 244g/L) | 31 | 6.975 | 0.122 | 60 |
| 18 | | Catalyst B(β-Zeolite : 255g/L) | 32 | 7.2 | 0.095 | 70 |
| 19 | | Catalyst C(USY·ZSM5 : 252g/L) | 29.8 | 6.705 | 0.11 | 24 |
| 20 | | Catalyst D(USY·ZSM5 : 238g/L) | 29.5 | 6.6375 | 0.14 | 30 |
| 21 | | Catalyst A(β-Zeolite : 250g/L) | 29 | 6.525 | 0.0758 | 97 |
| 22 | | Catalyst B(β-Zeolite : 230g/L) | 31.5 | 7.0875 | 0.068 | 99 |
| 23 | | Catalyst C(USY·ZSM5 : 245g/L) | 33 | 7.425 | 0.069 | 27 |
| 24 | | Catalyst D(USY·ZSM5 : 255g/L) | 35 | 7.875 | 0.075 | 40 |

FIG.6

| No. | First catalyst | Second catalyst | A/F(±5) | Oxygen concentration(%) | HC amount(g/test) | HC conversion rate(%) |
|---|---|---|---|---|---|---|
| 25 | | Catalyst A(β-Zeolite : 250g/L) | 11.4 | 2.565 | 0.289 | 2.2 |
| 26 | | Catalyst B(β-Zeolite : 265g/L) | 11.9 | 2.6775 | 0.22 | 3.8 |
| 27 | | Catalyst C(USY·ZSM5 : 245g/L) | 11 | 2.475 | 0.33 | 1.25 |
| 28 | | Catalyst D(USY·ZSM5 : 245g/L) | 10.5 | 2.3625 | 0.185 | 3.4 |
| 29 | | Catalyst A(β-Zeolite : 249g/L) | 9.9 | 2.2275 | 0.175 | 4.2 |
| 30 | | Catalyst B(β-Zeolite : 255g/L) | 12 | 2.7 | 0.16 | 5.3 |
| 31 | | Catalyst C(USY·ZSM5 : 244g/L) | 10.5 | 2.3625 | 0.152 | 2.2 |
| 32 | | Catalyst D(USY·ZSM5 : 240g/L) | 10.5 | 2.3625 | 0.118 | 3.1 |
| 33 | Oxidation catalyst | Catalyst A(β-Zeolite : 252g/L) | 21 | 4.725 | 0.139 | 41 |
| 34 | | Catalyst B(β-Zeolite : 249g/L) | 23 | 5.175 | 0.153 | 42 |
| 35 | | Catalyst C(USY·ZSM5 : 248g/L) | 21.5 | 4.8375 | 0.139 | 16 |
| 36 | | Catalyst D(USY·ZSM5 : 247g/L) | 20 | 4.5 | 0.162 | 28 |
| 37 | | Catalyst A(β-Zeolite : 250g/L) | 18 | 4.05 | 0.135 | 52 |
| 38 | | Catalyst B(β-Zeolite : 239g/L) | 23.5 | 5.2875 | 0.128 | 66 |
| 39 | | Catalyst C(USY·ZSM5 : 260g/L) | 21 | 4.725 | 0.13 | 24 |
| 40 | | Catalyst D(USY·ZSM5 : 262g/L) | 22.5 | 5.0625 | 0.21 | 29 |
| 41 | | Catalyst A(β-Zeolite : 244g/L) | 30 | 6.75 | 0.132 | 59 |
| 42 | | Catalyst B(β-Zeolite : 255g/L) | 31.8 | 7.155 | 0.09 | 68 |
| 43 | | Catalyst C(USY·ZSM5 : 252g/L) | 29.9 | 6.7275 | 0.105 | 23 |
| 44 | | Catalyst D(USY·ZSM5 : 238g/L) | 28.5 | 6.4125 | 0.135 | 34 |
| 45 | | Catalyst A(β-Zeolite : 250g/L) | 27.5 | 6.1875 | 0.072 | 98 |
| 46 | | Catalyst B(β-Zeolite : 230g/L) | 35 | 7.875 | 0.062 | 99.5 |
| 47 | | Catalyst C(USY·ZSM5 : 245g/L) | 36 | 8.1 | 0.072 | 28 |
| 48 | | Catalyst D(USY·ZSM5 : 255g/L) | 40 | 9 | 0.081 | 42 |

FIG.7

| No. | First catalyst | Second catalyst | A/F(±5) | Oxygen concentration(%) | HC amount(g/test) | HC conversion rate(%) |
|---|---|---|---|---|---|---|
| 49 | Hydrogen permeation catalyst | Catalyst A(β-Zeolite : 250g/L) | 11.2 | 2.52 | 0.275 | 1.8 |
| 50 | | Catalyst B(β-Zeolite : 265g/L) | 11.5 | 2.5875 | 0.23 | 3.7 |
| 51 | | Catalyst C(USY·ZSM5 : 245g/L) | 12 | 2.7 | 0.31 | 1.35 |
| 52 | | Catalyst D(USY·ZSM5 : 245g/L) | 16 | 3.6 | 0.195 | 3.2 |
| 53 | | Catalyst A(β-Zeolite : 249g/L) | 12 | 2.7 | 0.165 | 4.3 |
| 54 | | Catalyst B(β-Zeolite : 255g/L) | 13.5 | 3.0375 | 0.159 | 5.5 |
| 55 | | Catalyst C(USY·ZSM5 : 244g/L) | 11.5 | 2.5875 | 0.148 | 2.5 |
| 56 | | Catalyst D(USY·ZSM5 : 240g/L) | 10.5 | 2.3625 | 0.12 | 2.98 |
| 57 | | Catalyst A(β-Zeolite : 252g/L) | 22 | 4.95 | 0.129 | 39.8 |
| 58 | | Catalyst B(β-Zeolite : 249g/L) | 22.5 | 5.0625 | 0.148 | 41.5 |
| 59 | | Catalyst C(USY·ZSM5 : 248g/L) | 19.8 | 4.455 | 0.142 | 15.5 |
| 60 | | Catalyst D(USY·ZSM5 : 247g/L) | 18 | 4.05 | 0.157 | 2.9 |
| 61 | | Catalyst A(β-Zeolite : 250g/L) | 19.9 | 4.4775 | 0.145 | 50.5 |
| 62 | | Catalyst B(β-Zeolite : 239g/L) | 22.5 | 5.0625 | 0.119 | 65.3 |
| 63 | | Catalyst C(USY·ZSM5 : 260g/L) | 23 | 5.175 | 0.128 | 23 |
| 64 | | Catalyst D(USY·ZSM5 : 262g/L) | 21.5 | 4.8375 | 0.22 | 28.5 |
| 65 | | Catalyst A(β-Zeolite : 244g/L) | 29.2 | 6.57 | 0.129 | 58 |
| 66 | | Catalyst B(β-Zeolite : 255g/L) | 30.8 | 6.93 | 0.085 | 65 |
| 67 | | Catalyst C(USY·ZSM5 : 252g/L) | 30 | 6.75 | 0.104 | 21 |
| 68 | | Catalyst D(USY·ZSM5 : 238g/L) | 29.8 | 6.705 | 0.125 | 31 |
| 69 | | Catalyst A(β-Zeolite : 250g/L) | 26.4 | 5.94 | 0.065 | 95 |
| 70 | | Catalyst B(β-Zeolite : 230g/L) | 32 | 7.2 | 0.058 | 95 |
| 71 | | Catalyst C(USY·ZSM5 : 245g/L) | 35 | 7.875 | 0.068 | 29 |
| 72 | | Catalyst D(USY·ZSM5 : 255g/L) | 38 | 8.55 | 0.078 | 45 |

FIG.8

| No. | First catalyst | Second catalyst | A/F(±5) | Oxygen concentration (%) | HC amount (g/test) | HC conversion rate(%) |
|---|---|---|---|---|---|---|
| 73 | Three-way atalyst | Catalyst E (Without β-Zeolite) | 12 | 2.7 | 0.24 | 7 |
| 74 | Oxidation catalyst | | 11.5 | 2.5875 | 0.198 | 5 |
| 75 | Hydrogen permeation catalyst | | 13 | 2.925 | 0.21 | 4 |
| 76 | Three-way atalyst | | 20 | 4.5 | 0.18 | 15 |
| 77 | Oxidation catalyst | | 22 | 4.95 | 0.175 | 20 |
| 78 | Hydrogen permeation catalyst | | 21 | 4.725 | 0.179 | 17 |
| 79 | Three-way atalyst | | 35 | 7.875 | 0.128 | 20 |
| 80 | Oxidation catalyst | | 32 | 7.2 | 0.11 | 25 |
| 81 | Hydrogen permeation catalyst | | 36 | 8.1 | 0.19 | 18 |

EXHAUST GAS PURIFYING SYSTEM

CROSS-REFERENCE TO RELATED APPLICATIONS

The present application is a divisional of U.S. application Ser. No. 10/833,049, filed Apr. 28, 2004 now U.S. Pat. No. 6,932,067, the entire contents of which are incorporated herein by reference.

BACKGROUND OF THE INVENTION

1. Field of the Invention

The present invention relates to an exhaust gas purifying system which removes harmful components contained in exhaust gas discharged from an internal combustion engine for an automobile. Particularly, the present invention relates to an exhaust gas purifying system capable of purifying hydrocarbons contained in exhaust gas in a low-temperature range before an exhaust gas purifying catalyst is activated.

2. Description of the Related Art

An exhaust gas purifying catalyst and an exhaust gas purifying system using zeolite have been proposed in order to reduce hydrocarbons (cold HC) which are discharged in large quantity in a low-temperature range at the time of starting up an engine, regardless of a gasoline engine or a diesel engine (see Japanese Patent Application Laid-Open No. H7-174017).

Moreover, for the purpose of catalytic activation at the time of starting up an engine, an electrically heated catalyst (EHC) and a system using an air pump have been also proposed (see Japanese Patent Application Laid-Open Nos. H9-256840 and H9-228828).

SUMMARY OF THE INVENTION

However, in a conventional exhaust gas purifying catalyst using zeolite, a zeolite layer is provided as a lower layer and a catalyst layer is provided as an upper layer. Specifically, the exhaust gas purifying catalyst adsorbs hydrocarbons in a low-temperature range at the time of starting up an engine by use of the lower zeolite layer. Thereafter, the exhaust gas purifying catalyst desorbs the adsorbed hydrocarbons at a point in time when the upper noble metal catalyst layer reaches its activation temperature. Thus, the hydrocarbons are purified by the catalyst layer. Moreover, in the conventional technology described above, as an exhaust gas purifying system, there has been also disclosed a system in which a catalyst having only a zeolite layer (a zeolite catalyst) is disposed. In this case, it is required to further provide a three-way catalyst downstream of the zeolite catalyst.

Specifically, in the conventional exhaust gas purifying catalyst or system using zeolite, the zeolite is used for adsorbing cold HC but not for purifying the cold HC. Therefore, in order to purify adsorbed HC by use of zeolite at low temperature, it is required to further provide a three-way catalyst in an upper layer of a zeolite layer or downstream thereof. Consequently, a large amount of a noble metal is used, which has been a factor in cost increases.

Furthermore, as to adoption of a conventional EHC, an air pump and the like, additional equipment is required. Therefore, in terms of installation spaces and cost increases, it is still the case that the EHC, the air pump, and the like have not been put to practical use yet.

The present invention was made in consideration of the above problems. An object of the present invention is to provide an exhaust gas purifying system which purifies cold HC without providing a three-way catalyst in an upper layer of a zeolite layer or downstream of a zeolite catalyst and without further providing new additional equipment.

According to one aspect of the present invention, there is provided an exhaust gas purifying system comprising: a first catalyst which contains a noble metal and reduces hydrocarbons contained in exhaust gas; and a second catalyst which is disposed downstream of the first catalyst and contains β-zeolite, wherein a mixed gas having an air-fuel ratio of not less than 25 is burned in an internal combustion engine, and the internal combustion engine discharges the exhaust gas having an oxygen concentration of not less than 4% continuously or intermittently.

BRIEF DESCRIPTION OF THE DRAWINGS

The invention will now be described with reference to the accompanying drawings wherein.

DETAILED DESCRIPTION OF THE PREFERRED EMBODIMENTS

Hereinafter, description will be made of embodiments of the present invention with reference to the drawings.

An exhaust gas purifying system according to a first embodiment of the present invention will be described.

Figure 1:
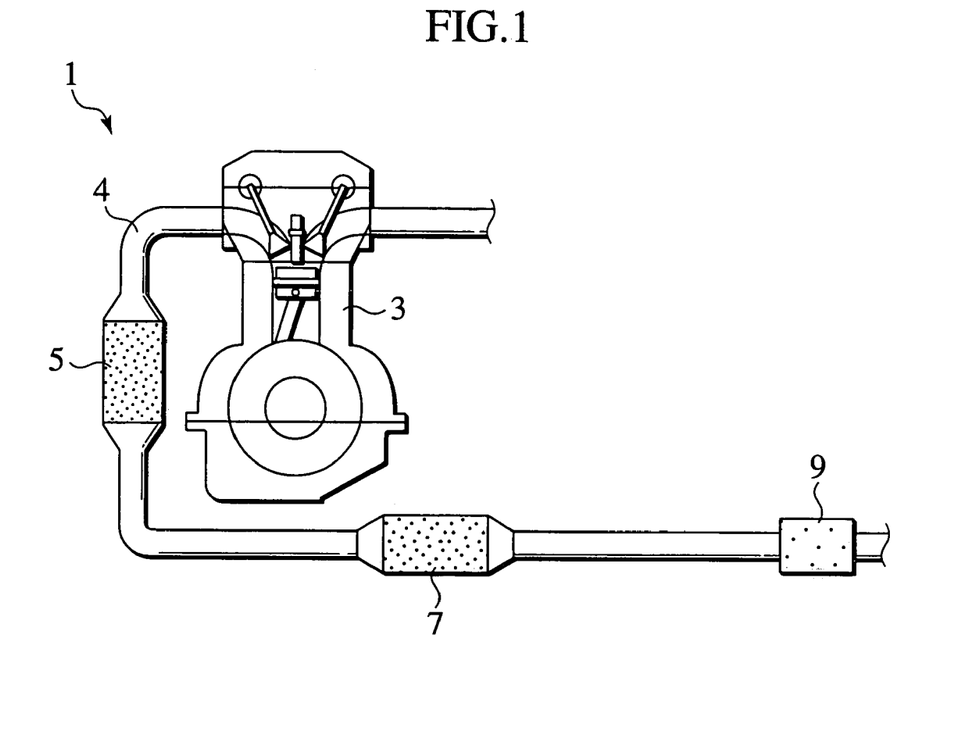
FIG. 1 is a schematic view showing an exhaust gas purifying system according to a first embodiment of the present invention.

An exhaust gas purifying system 1 of the present invention is a system used for an internal combustion engine 3 in which a mixed gas having an air-fuel ratio (A/F) of 25 or more is burned and from which exhaust gas having an oxygen concentration of 4% or more is continuously or intermittently discharged. Furthermore, as shown in FIG. 1, in the exhaust gas purifying system 1 of the present invention, a first catalyst 5 is disposed on an upstream side in an exhaust gas passage 4 of the internal combustion engine 3 and a second catalyst 7 is disposed downstream of the first catalyst 5. Here, the first catalyst 5 contains a noble metal and reduces at least hydrocarbons contained in the exhaust gas, and the second catalyst 7 contains β-zeolite. Incidentally, in FIG. 1, reference numeral 9 denotes a muffler.

The first catalyst 5 contains a noble metal, and purifies at least hydrocarbons (HC) contained in the exhaust gas. As the first catalyst, a three-way catalyst, a hydrogen permeation catalyst, an oxidation catalyst, a NOx storage-reduction catalyst or the like can be used. Here, the hydrogen permeation catalyst is a catalyst which allows hydrogen contained in the exhaust gas to permeate as it is without oxidizing the hydrogen. The hydrogen permeation catalyst is used for accelerating NOx reduction reaction by sending hydrogen to a catalyst disposed downstream of the hydrogen permeation catalyst. Note that the noble metal described here means platinum (Pt), palladium (Pd), rhodium (Rh) or the like.

The second catalyst 7 is a catalyst containing zeolite. Moreover, the use of β-zeolite as zeolite makes it possible to purify cold HC effectively. β-zeolite acts as an oxidation catalyst in an oxygen rich atmosphere in which the air-fuel ratio of the mixed gas is high and the oxygen concentration is 4% or more. In addition, even if there is no noble metal catalyst, β-zeolite can purify adsorbed HC both in a low-temperature range (temperature range from 100 to 250° C.) and in a high-temperature range (250° C. or more). Therefore, in the exhaust gas purifying system of the present invention, disposing of the catalyst containing β-zeolite on the downstream side in the exhaust gas passage makes it possible to efficiently purify even cold HC discharged in the low-temperature range before activation of the noble metal catalyst.

Moreover, the second catalyst 7 may include only a zeolite layer formed of β-zeolite. In other words, the second catalyst 7 may have a single layer structure including only the zeolite layer. Even if the second catalyst 7 includes no catalyst layer formed of a noble metal, alumina or the like, the exhaust gas purifying system of the present invention can purify the cold HC efficiently. Since β-zeolite has the properties as described above, the cold HC can be sufficiently purified even if the second catalyst includes no catalyst layer, as long as the oxygen concentration in the exhaust gas is 4% or more. Moreover, since the second catalyst may have the single layer structure including only the zeolite layer, the amount of a noble metal can be reduced, and preparation of catalysts is also facilitated.

The exhaust gas purifying system of the present invention is suitably used for a diesel engine as the internal combustion engine. The diesel engine has a characteristic that it can be operated in a lean range (A/F≧20) in comparison with a gasoline engine. Therefore, cold HC discharged from the diesel engine in the low-temperature range before activation of the noble metal catalyst is less than that discharged from the gasoline engine. Moreover, in the diesel engine, the air-fuel ratio becomes 40 or more immediately after the engine is started and becomes 25 or more under steady operation (while running). That is, since the oxygen concentration in the exhaust gas can be maintained at 4% or more in the diesel engine, the exhaust gas purifying system of the present invention can be suitably used. However, when a NOx storage-reduction catalyst is disposed in the diesel engine and intake air is reduced immediately after the engine is started to perform rich spike by use of a common rail injection system, the air-fuel ratio temporarily drops. Accordingly, discharge of the exhaust gas having an oxygen concentration of 4% or more sometimes becomes intermittent. However, since the air-fuel ratio drops for a very short period of time, the exhaust gas purifying system of the present invention can efficiently purify the cold HC also in such a case as described above.

In the case of using the exhaust gas purifying system of the present invention in the diesel engine, since the amount of cold HC is relatively small as described above, a certain level of HC purification performance can be obtained without controlling the amount of HC flowing into the second catalyst. However, in order to form the second catalyst only by use of β-zeolite, it is required to suppress the cold HC to a certain amount. Therefore, it is preferable that the amount of HC flowing into the second catalyst including β-zeolite be reduced in such a manner that the first catalyst, such as the three-way catalyst, the hydrogen permeation catalyst or the oxidation catalyst, is disposed on the upstream side in the exhaust gas passage to purify HC to some extent.

Figure 2:
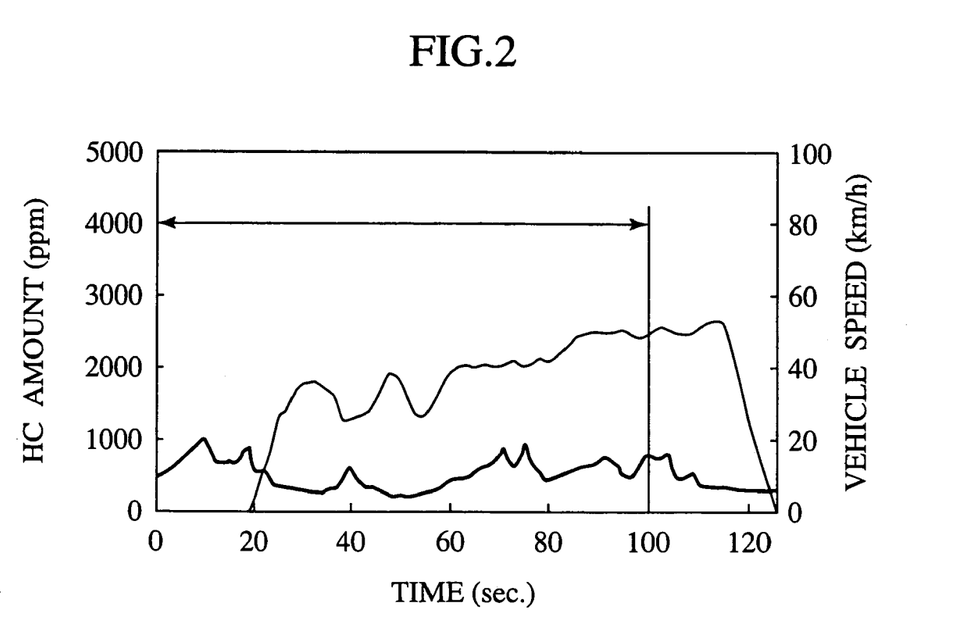
FIG. 2 is a graph showing A-bag of LA#4-CH of North America exhaust gas testing method and amounts of HC flowing into a second catalyst.

As the first catalyst provided on the upstream side in the exhaust gas passage, the three-way catalyst, the hydrogen permeation catalyst, the oxidation catalyst, the NOx storage-reduction catalyst or the like can be used as described above. As to specific performance of the first catalyst, it is preferable that the first catalyst be a catalyst which sets the amount of unpurified HC flowing into the second catalyst for 100 seconds after the engine is started to not more than 0.25 g/test per 1 liter of the second catalyst. Moreover, it is more preferable that the first catalyst be a catalyst which sets the amount of unpurified HC flowing into the second catalyst for 70 seconds after the engine is started to not more than 0.15 g/test per 1 liter of the second catalyst. Specifically, there is a correlation between oxidation catalyst performance of β-zeolite of the second catalyst and the oxygen concentration. Significant catalyst performance is observed up to an oxygen concentration of 4%, but the catalyst performance becomes less effective at an oxygen concentration of more than 4% and is considered to be saturated. Moreover, since the amount of β-zeolite that can be used is limited, the amount of HC that can be purified is also limited naturally. Therefore, it is required to limit the amount of HC flowing into the second catalyst. A concrete amount thereof fluctuates in view of the amount of zeolite and is preferably not more than 0.25 g/test, more preferably not more than 0.15 g/test per 1 liter of the second catalyst. Here, "a catalyst which sets the amount of unpurified HC flowing into the second catalyst for 100 seconds after the engine is started to not more than 0.25 g/test per 1 liter of the second catalyst" means a catalyst which sets the total amount of unpurified HC flowing into the second catalyst for 100 seconds after a test is started to not more than 0.25 g per 1 liter of the second catalyst, according to LA#4-CH of North America exhaust gas testing method. Note that FIG. 2 shows one example of the amounts of HC flowing into the second catalyst in A-bag of LA#4-CH when the three-way catalyst is used as the first catalyst. These HC amounts are changed depending on engine displacement, engine control, the type and capacity of the first catalyst and the like. Therefore, the HC amounts are not always those shown in FIG. 2.

Next, an exhaust gas purifying system according to a second embodiment of the present invention will be described.

Figure 3:
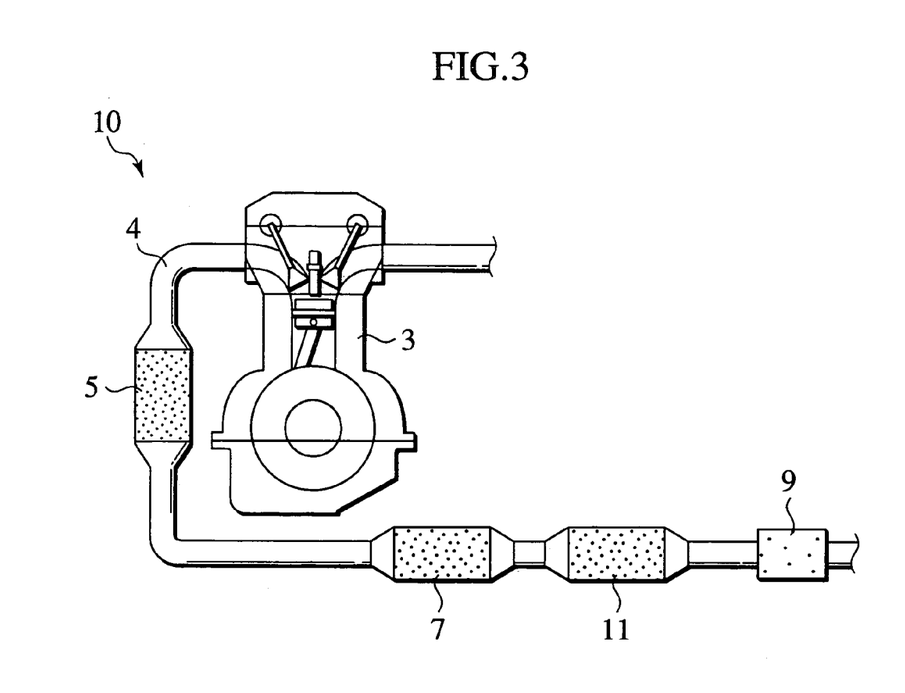
FIG. 3 is a schematic view showing an exhaust gas purifying system according to a second embodiment of the present invention.

An exhaust gas purifying system 10 according to the second embodiment of the present invention is a system used for an internal combustion engine 3 in which a mixed gas having an air-fuel ratio of 25 or more is burned and from which exhaust gas having an oxygen concentration of 4% or more is continuously or intermittently discharged. Furthermore, as shown in FIG. 3, in the exhaust gas purifying system 10 of the present invention, a first catalyst 5 is disposed on an upstream side in an exhaust gas passage 4, a second catalyst 7 including only β-zeolite is disposed downstream of the first catalyst 5, and a third catalyst 11 is further disposed downstream of the second catalyst 7. The third catalyst 11 contains a noble metal and alumina and/or ceria. Furthermore, the third catalyst 11 contains at least one element selected from the group consisting of alkali metals and alkaline-earth metals as required.

As the third catalyst 11, a three-way catalyst, an oxidation catalyst, a NOx storage-reduction catalyst or the like can be used. Note that the third catalyst 11 described above may be housed in a separate catalyst container. Alternatively, it is also possible to divide a catalyst container of the second catalyst 7 into front and rear sections and house the second and third catalysts 7 and 11 in the front and rear sections, respectively.

By use of the exhaust gas purifying system 10 according to the second embodiment of the present invention, the cold HC can be purified by oxidation catalysis caused by β-zeolite in the second catalyst 7 in a low-temperature range immediately after the engine is started and before activation of the noble metals contained in the first catalyst 5 and the third catalyst 11. Moreover, after the temperatures of the noble metal catalysts rises and the noble metal catalysts are sufficiently activated, purification action by the noble metal catalysts is added to the oxidation catalysis of HC by β-zeolite. Thus, more efficient HC purification is performed.

Moreover, the third catalyst may contain at least one element selected from the group consisting of alkali metals and alkaline-earth metals, whereby HC oxidation activity of catalyst components can be enhanced and deterioration of catalyst components over time can be suppressed. Accordingly, the third catalyst can maintain high efficiency in purification processing of desorbed HC and can achieve high purification performance as the three-way catalyst.

Figure 4:
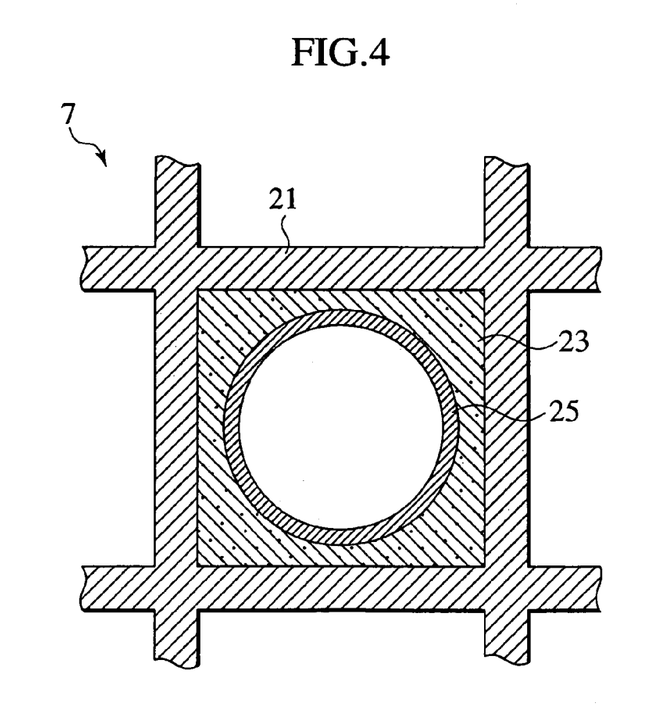
FIG. 4 is a cross-sectional view showing a second catalyst having a multilayer structure.

In the exhaust gas purifying system of the present invention, the second catalyst 7 may have a multilayer structure. Specifically, as shown in FIG. 4, the second catalyst 7 can have a structure in which a β-zeolite layer is provided as a lower layer 23 on a honeycomb substrate 21 and an upper layer 25 containing a noble metal and alumina and/or ceria is formed on the lower layer. Furthermore, the upper layer 25 may contain at least one element selected from the group consisting of alkali metals and alkaline-earth metals as required. By adopting such a multilayer structure, similarly to the case of providing the third catalyst on the most downstream side in the exhaust gas passage, the cold HC purification by β-zeolite and more efficient HC purification by the noble metal catalyst after the temperature rise can be performed. Moreover, the upper layer 25 contains at least one element selected from the group consisting of alkali metals and alkaline-earth metals, whereby HC oxidation activity of catalyst components can be enhanced and deterioration of catalyst components over time can be suppressed similarly to the third catalyst described above.

Here, in the case where the upper layer 25 containing an alkali metal or alkaline-earth metal is provided on the zeolite layer that is the lower layer 23, it is preferable to use an alkali metal compound and an alkaline-earth metal compound which are hardly soluble or insoluble in water. The lower layer 23 and the upper layer 25 can be provided on the substrate 21 in the following manner. Specifically, the substrate 21 is coated with slurry of a material used for forming the lower and upper layers 23 and 25, and the substrate 21 coated with the slurry is dried and baked. However, when an alkali metal and an alkaline-earth metal which are soluble in water are used, the alkali metal and alkaline-earth metal which have been eluted in the slurry enter into zeolite pores with the movement of the water in the slurry. Accordingly, there is a possibility that the cold HC is not adsorbed in the zeolite. When the cold HC is not adsorbed in the zeolite, HC purification reaction by the zeolite does not occur. Consequently, it becomes impossible to sufficiently purify the HC. Specifically, by use of the alkali metal compound and alkaline-earth metal compound which are hardly soluble or insoluble in water, entering of metal ions into the zeolite pores can be suppressed. Thus, high adsorption efficiency can be maintained at all times.

In the present invention, as β-zeolite used in the second catalyst, from the viewpoint of thermal stability of a crystal structure, it is possible to suitably use one having a $SiO_2/Al_2O_3$ molar ratio ranging from 5 to 1000, more preferably from 30 to 70. Moreover, it is preferable that the coating amount of the β-zeolite on a honeycomb substrate or the like be within a range from 150 to 500 g/L. Furthermore, it is preferable that the coating amount of a catalyst layer containing a noble metal, which is formed as the upper layer on the lower layer formed of β-zeolite, be within a range from 50 to 300 g/L. Note that it is preferable that the coating amount of the third catalyst be also within a range from 50 to 300 g/L.

The present invention will be described below further in detail by use of examples. However, the present invention is not limited only to these examples. Note that description will be given of only constitutions of the second catalyst in the following examples and comparative examples.

EXAMPLE 1

β-zeolite powder having a $SiO_2/Al_2O_3$ molar ratio of 40, silica sol and pure water were put in a ball mill pot made of alumina, and then mixed and milled, thus obtaining a slurry. A cordierite honeycomb substrate (volume of 1.0 L) was coated with this slurry and the extra slurry in cells was removed by airflow. Furthermore, 30° C. air was flowed at a wind velocity of 5 m/s to dry the substrate for 30 minutes. Subsequently, after the substrate was dried for 15 minutes under air flow at 150° C., the substrate was baked at 400° C. for one hour. By use of this method, a number of catalysts A according to example 1 were prepared. Note that, in coating of the slurry, a target value of a zeolite layer amount after dried was set to 250 g/L.

EXAMPLE 2

On a β-zeolite layer of the catalyst A obtained in example 1, a catalyst layer was formed in the following manner, whereby a catalyst B according to example 2 was prepared. First, alumina powder (Al: 97 mol %) containing 3 mol % of cerium (Ce) was impregnated with an aqueous solution of palladium nitrate and then dried at 150° C. for 24 hours. Thereafter, this powder was baked at 400° C. for one hour and then at 600° C. for one hour. Thus, alumina powder on which Pd was supported (powder a) was obtained. This powder a had a Pd concentration of 4.0%.

Meanwhile, cerium oxide powder (Ce: 67 mol %) containing 1 mol % of lanthanum (La) and 32 mol % of zirconium (Zr) was impregnated with an aqueous solution of palladium nitrate and then similarly dried at 150° C. for 24 hours. Thereafter, this powder was baked at 400° C. for one hour and then at 600° C. for one hour. Thus, cerium oxide powder on which Pd was supported (powder b) was obtained. This powder b had a Pd concentration of 2.0%.

Next, 400 g of the powder a and 141 g of the powder b, 240 g of nitric acid alumina sol, 100 g of barium carbonate and 2000 g of pure water were put in a magnetic ball mill, and then mixed and milled, thus obtaining a slurry. This slurry was applied onto the β-zeolite layer of the catalyst A described above, dried after removing the extra slurry in the cells by airflow, and baked at 400° C. for one hour. Thus, a catalyst A' was obtained. Note that this catalyst layer had a weight of 66.5 g/L. Here, the nitric acid alumina sol was a sol obtained by adding 10% of nitric acid to 10% of boehmite alumina. Moreover, 240 g of nitric acid alumina sol is equivalent to 24 g of $Al_2O_3$. Moreover, 100 g of barium carbonate is equivalent to 67 g of barium oxide (BaO).

Further, alumina powder (Al: 97 mol %) containing 3 mol % of Zr was impregnated with an aqueous solution of rhodium nitrate and then dried at 150° C. for 24 hours. Thereafter, this powder was baked at 400° C. for one hour and then at 600° C. for one hour. Thus, alumina powder on which Rh was supported (powder c) was obtained. This powder c had a Rh concentration of 2.0%.

Moreover, alumina powder (Al: 97 mol %) containing 3 mol % of Ce was impregnated with a dinitrodiammine platinum solution and then dried at 150° C. for 21 hours. Thereafter, this powder was baked at 400° C. for one hour and then at 600° C. for one hour. Thus, alumina powder on which Pt was supported (powder d) was obtained. This powder d had a Pt concentration of 3.0%.

Furthermore, zirconium oxide powder containing 1 mol % of La and 20 mol % of Ce was impregnated with a dinitrodiammineplatinum solution and then dried at 150° C. for 24 hours. Thereafter, this powder was baked at 400° C. for one hour and then at 600° C. for one hour. Thus, alumina powder on which Pt was supported (powder e) was obtained. This powder e had a Pt concentration of 3.0%.

Thereafter, 118 g of the powder c, 118 g of the powder d, 118 g of the powder e, and 160 g of nitric acid alumina sol were put in a magnetic ball mill, and then mixed and milled, thus obtaining a slurry. This slurry was applied onto the coated catalyst A' described above, dried after removing the extra slurry in the cells by airflow, and baked at 400° C. for one hour. Thus, the catalyst B according to example 2 was prepared. Note that this catalyst layer had a weight of 37 g/L.

The amounts of the noble metals supported on the catalyst B were 0.71 g/L of Pt, 1.88 g/L of Pd and 0.24 g/L of Rh.

COMPARATIVE EXAMPLE 1

A number of catalysts C of comparative example 1 were prepared by repeating procedures similar to those of example 1 except that USY.ZSM5 zeolite was used instead of β-zeolite used in example 1.

COMPARATIVE EXAMPLE 2

On a zeolite layer of the catalyst C obtained in comparative example 1, a catalyst layer was formed through similar procedures to those of example 2. Thus, a catalyst D according to comparative example 2 was prepared.

Figure 5:
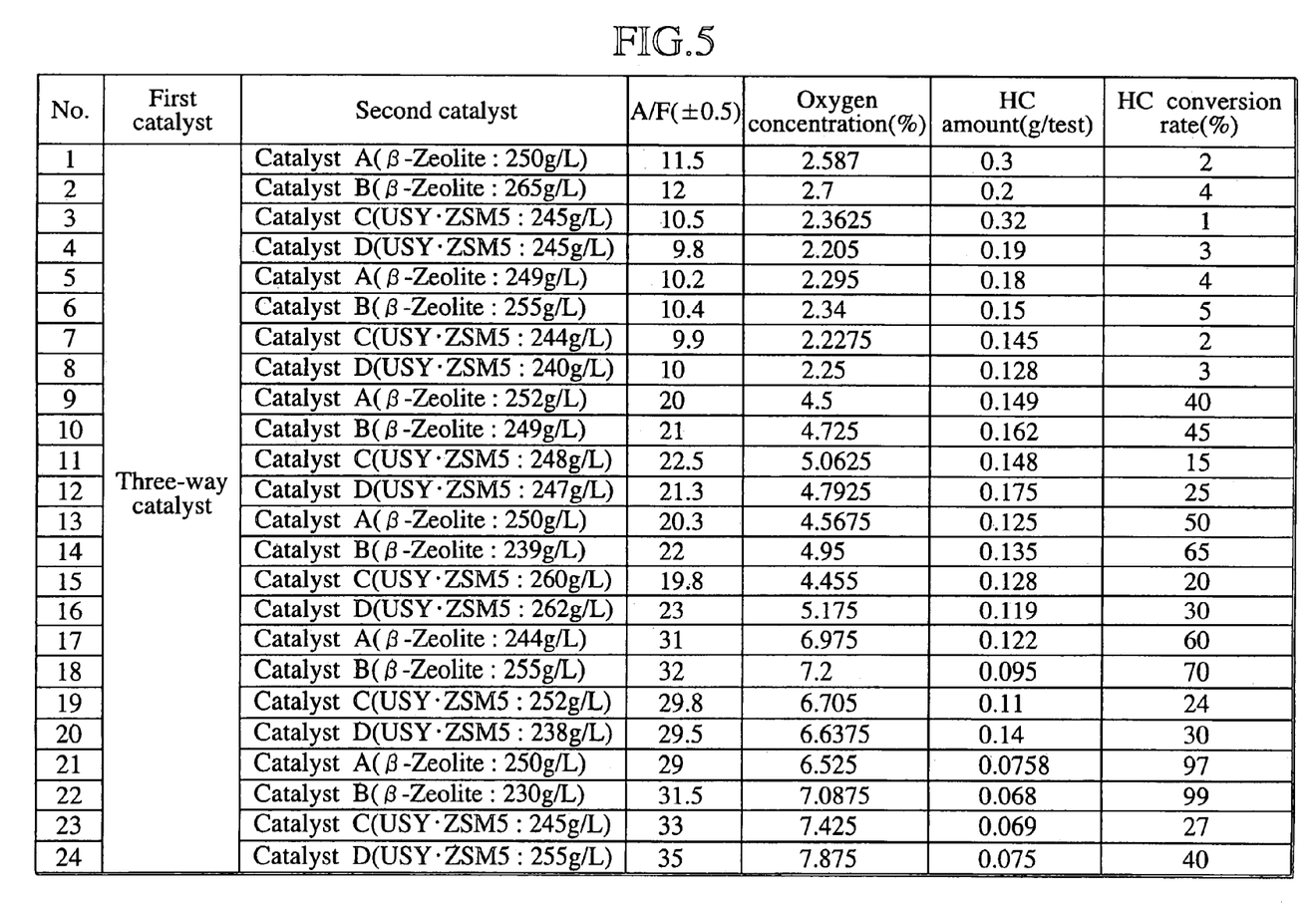
FIGS. 5, 6, 7 and 8 are tables showing evaluation results of catalysts according to examples and comparative examples.
Figure 6:
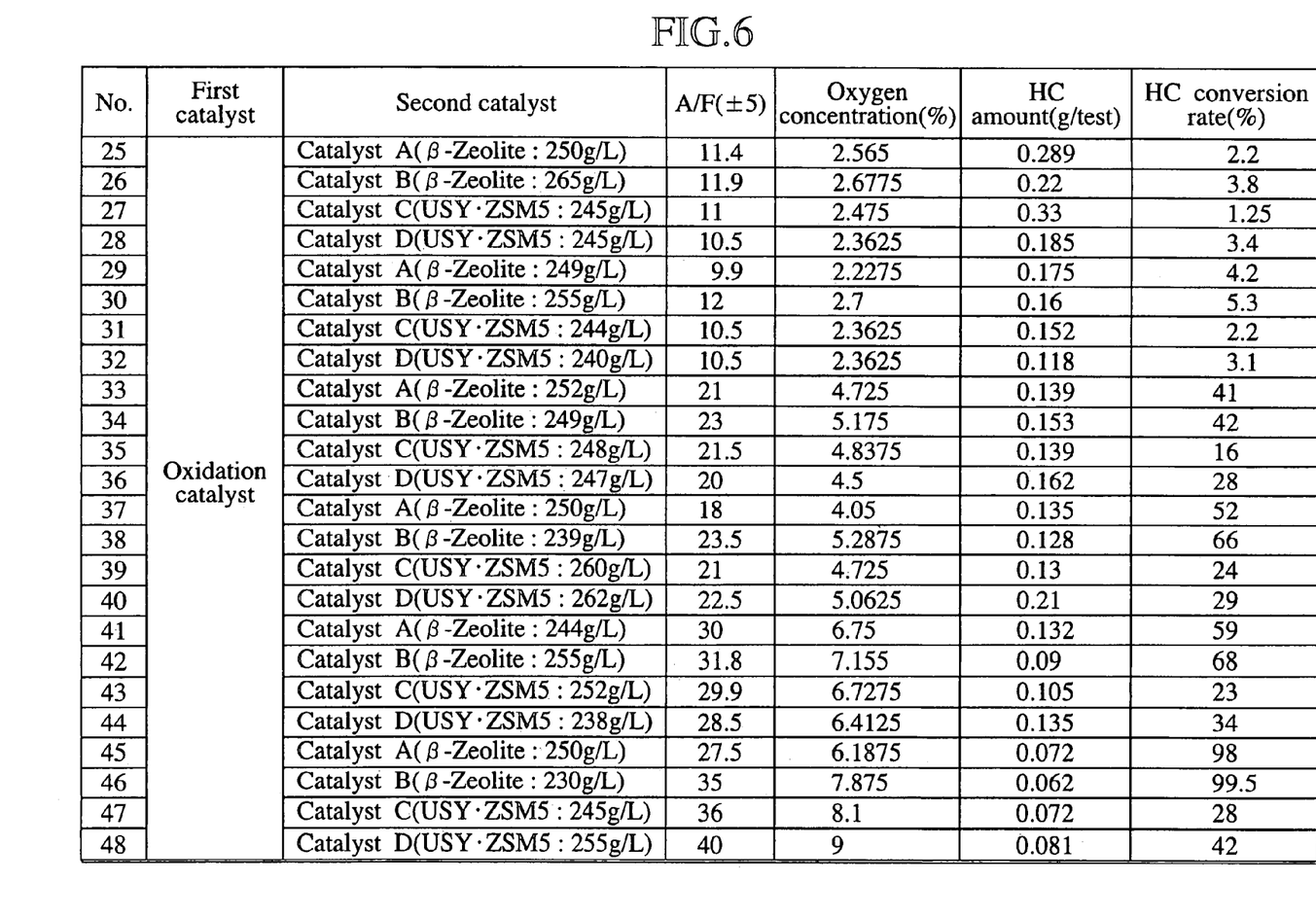
Figure 7:
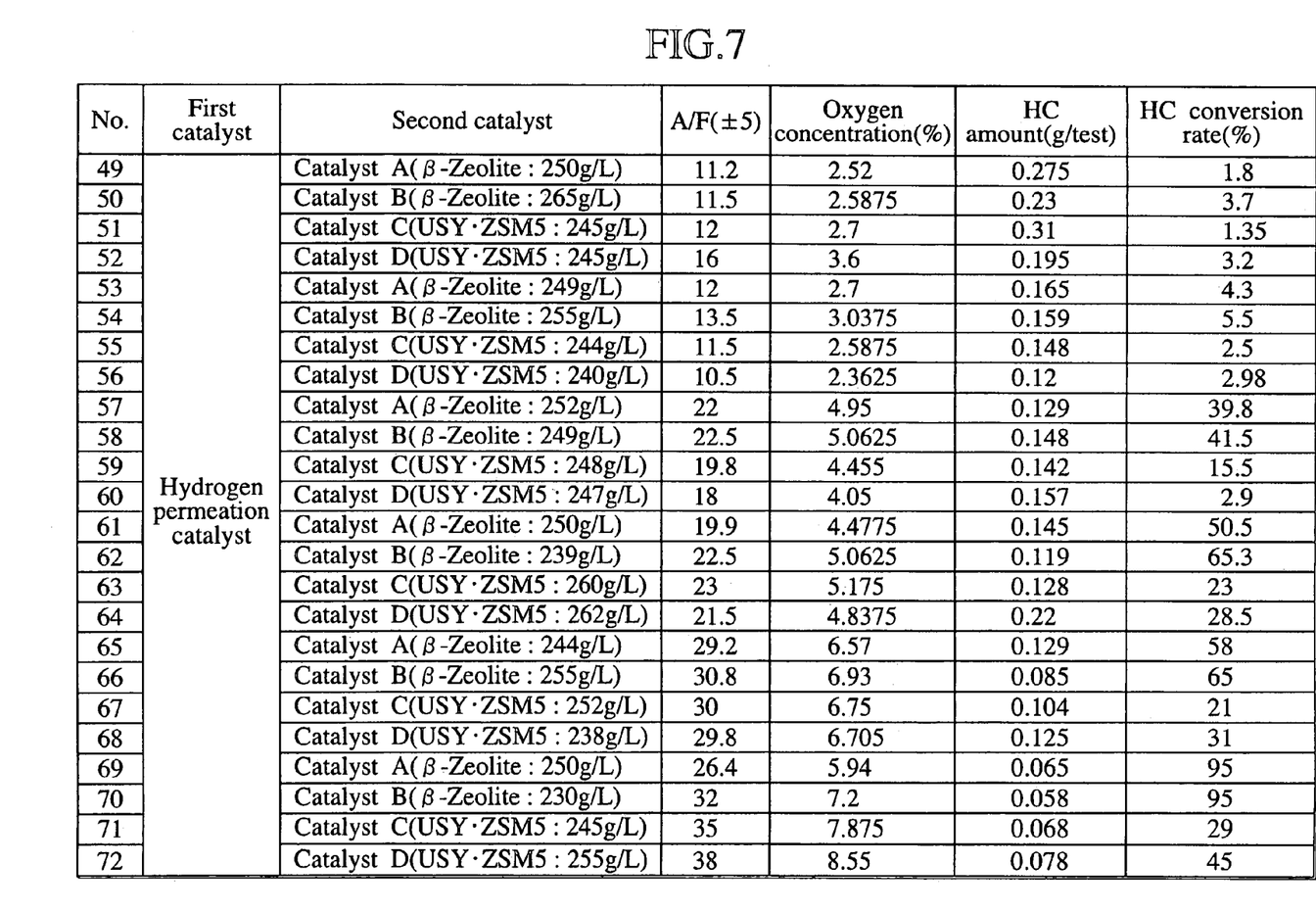
Figure 8:
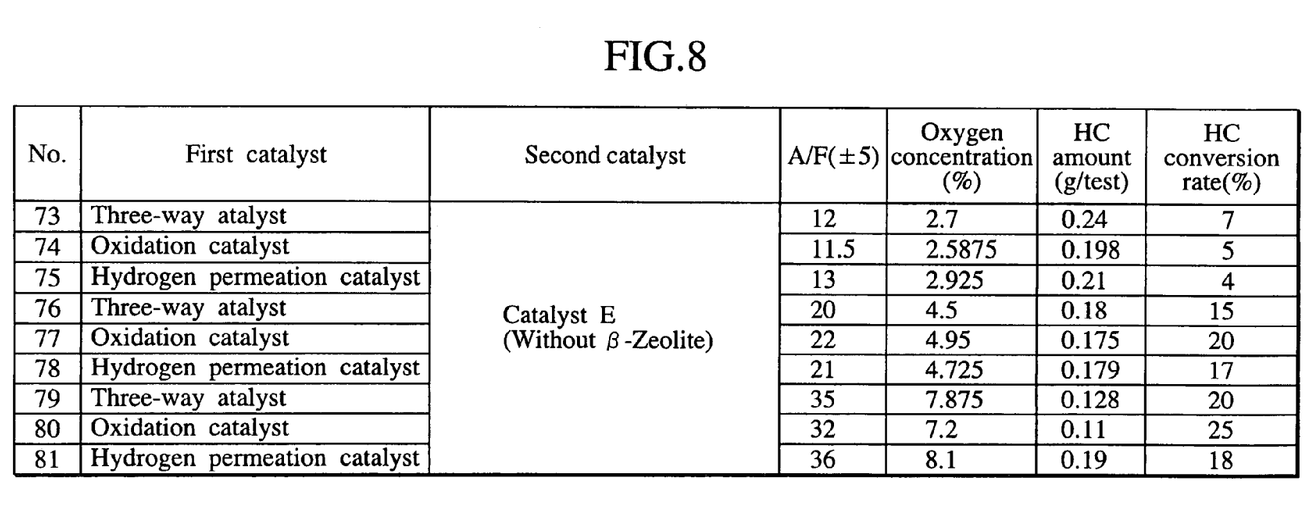

Performance evaluation was carried out as follows. As a first catalyst, a normal three-way catalyst (Pt: 0.71 g/L, Pd: 1.88 g/L and Rh: 0.24 g/L), an oxidation catalyst (Pt: 4 g/L) and a hydrogen permeation catalyst (Pt: 8 g/L) were disposed as shown in FIGS. 5 to 8. Further, as a second catalyst, the catalysts A to D, which had been prepared according to the examples and comparative examples described above and subjected to durability tests under the following conditions, were disposed as shown in FIGS. 5 to 7. In FIG. 8, evaluation was conducted by use of a catalyst E as the second catalyst, which was obtained by removing the β-zeolite layer from the catalyst A.

In the durability test of the second catalyst, an engine with a displacement of 3000 cc was used as a durability device and gasoline (Nisseki Dash) was used as a fuel. As durability conditions, the gas temperature at a catalyst inlet was set to 700° C. and the time of the durability test was set to 100 hours.

LA#4 evaluation tests were carried out under the conditions of air-fuel ratio, oxygen concentration in exhaust gas, and amount of HC flowing into the second catalyst, as shown in FIGS. 5 to 8. FIGS. 5 to 8 list HC conversion rates in A-bag of LA#4-CH. Note that, as an engine for an evaluation system, a gasoline engine, a lean-burn engine and a diesel engine were used to obtain a wide range of air-fuel ratios. Incidentally, each of the HC amounts in FIGS. 5 to 8 indicates the total amount of HC flowing into the second catalyst for 100 seconds after the engine is started.

As a result, the cases of the catalysts A and B, which included the β-zeolite layers, showed higher HC conversion rates than the cases of the catalysts C and D, which included layers formed of zeolite other than β-zeolite, and of the three-way catalyst including no zeolite layer. Particularly, when the air-fuel ratio was high and the oxygen concentration in the exhaust gas was high, the HC conversion rate could be increased to about 60% or more.

The entire content of a Japanese Patent Application No. P2003-148518 with a filing date of May 27, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. An exhaust gas purifying system, comprising:
    an internal combustion engine which discharges an exhaust gas having an oxygen concentration of not less than 4% continuously or intermittently;
    a first catalyst which reduces hydrocarbon contained in the exhaust gas; and
    a second catalyst which is disposed downstream of the first catalyst, reduces hydrocarbon contained in the exhaust gas and includes β-zeolite,
    wherein the first catalyst reduces an amount of hydrocarbon flowing into the second catalyst for 100 seconds after the internal combustion engine is started to not more than 0.25 g/test per 1 liter of the second catalyst.

2. An exhaust gas purifying system according to claim 1, wherein a mixed gas having an air-fuel ratio of not less than 25 is burned in the internal combustion engine.

3. An exhaust gas purifying system according to claim 2, wherein, in the internal combustion engine, a mixed gas having an air-fuel ratio of not less than 40 is burned at the time of starting up the engine and the mixed gas having the air-fuel ratio of not less than 25 is burned while running, and
    the oxygen concentration in the exhaust gas discharged from the internal combustion engine is always not less than 4%.

4. An exhaust gas purifying system according to claim 1, wherein the second catalyst includes only a zeolite layer formed of β-zeolite.

5. An exhaust gas purifying system according to claim 1, wherein the first catalyst reduces an amount of hydrocarbon flowing into the second catalyst for 70 seconds after the internal combustion engine is started to not more than 0.15 g/test per 1 liter of the second catalyst.

6. An exhaust gas purifying system according to claim 1, further comprising:
    a third catalyst which is disposed downstream of the second catalyst and contains a noble metal and both of or one of alumina and ceria.

7. An exhaust gas purifying system according to claim 6, wherein the third catalyst contains at least one element selected from the group consisting of alkali metals and alkaline-earth metals.

8. An exhaust gas purifying system according to claim 1, wherein the second catalyst has a multilayer structure,
a lower layer in the multilayer structure is a zeolite layer formed of β-zeolite, and
an upper layer in the multilayer structure contains a noble metal and both of or one of alumina and ceria.

9. An exhaust gas purifying system according to claim 8, wherein the upper layer contains at least one element selected from the group consisting of alkali metals and alkaline-earth metals.

10. An exhaust gas purifying system according to claim 1, wherein a $SiO_2/Al_2O_3$ molar ratio of β-zeolite ranges from 5 to 1000.

11. An exhaust gas purifying system according to claim 10, wherein the $SiO_2/Al_2O_3$ molar ratio ranges from 30 to 70.

12. An exhaust gas purifying system according to claim 1, wherein the second catalyst includes a substrate supporting β-zeolite, and
a coating amount of β-zeolite on the substrate is within a range from 150 to 500 g/L.

13. An exhaust gas purifying system according to claim 12,
wherein the coating amount of β-zeolite on the substrate is within a range from 50 to 300 g/L.

14. An exhaust gas purifying system according to claim 1, wherein the internal combustion engine is a diesel engine.

15. An exhaust gas purifying system, comprising:
an internal combustion engine which discharges an exhaust gas having an oxygen concentration of not less than 4% continuously or intermittently;
a first catalyst which reduces hydrocarbon contained in the exhaust gas; and
a second catalyst which is disposed downstream of the first catalyst, reduces hydrocarbon contained in the exhaust gas and includes β-zeolite,
wherein the first catalyst reduces an amount of hydrocarbon flowing into the second catalyst for 70 seconds after the internal combustion engine is started to not more than 0.15 g/test per 1 liter of the second catalyst.

16. An exhaust gas purifying system according to claim 15,
wherein a mixed gas having an air-fuel ratio of not less than 25 is burned in the internal combustion engine.

17. An exhaust gas purifying system according to claim 16,
wherein, in the internal combustion engine, a mixed gas having an air-fuel ratio of not less than 40 is burned at the time of starting up the engine and the mixed gas having the air-fuel ratio of not less than 25 is burned while running, and
the oxygen concentration in the exhaust gas discharged from the internal combustion engine is always not less than 4%.

18. An exhaust gas purifying system, comprising:
an internal combustion engine which burns a mixed gas having an air-fuel ratio of not less than 25;
a first catalyst which reduces hydrocarbon contained in an exhaust gas discharged from the internal combustion engine; and
a second catalyst which is disposed downstream of the first catalyst, reduces hydrocarbon contained in the exhaust gas and includes β-zeolite,
wherein the first catalyst reduces an amount of hydrocarbon flowing into the second catalyst for 100 seconds after the internal combustion engine is started to not more than 0.25 g/test per 1 liter of the second catalyst.

19. An exhaust gas purifying system according to claim 18,
wherein, in the internal combustion engine, a mixed gas having an air-fuel ratio of not less than 40 is burned at the time of starting up the engine and the mixed gas having the air-fuel ratio of not less than 25 is burned while running.

20. An exhaust gas purifying system according to claim 18,
wherein the first catalyst reduces an amount of hydrocarbon flowing into the second catalyst for 70 seconds after the internal combustion engine is started to not more than 0.15 g/test per 1 liter of the second catalyst.

21. An exhaust gas purifying system, comprising:
an internal combustion engine which burns a mixed gas having an air-fuel ratio of not less than 25;
a first catalyst which reduces hydrocarbon contained in an exhaust gas discharged from the internal combustion engine; and
a second catalyst which is disposed downstream of the first catalyst, reduces hydrocarbon contained in the exhaust gas and includes β-zeolite,
wherein the first catalyst reduces an amount of hydrocarbon flowing into the second catalyst for 70 seconds after the internal combustion engine is started to not more than 0.15 g/test per 1 liter of the second catalyst.

22. An exhaust gas purifying system according to claim 21,
wherein, in the internal combustion engine, a mixed gas having an air-fuel ratio of not less than 40 is burned at the time of starting up the engine and a mixed gas having the air-fuel ratio of not less than 25 is burned while running.

* * * * *